United States Patent [19]
Secher

[11] 3,882,359

[45] May 6, 1975

[54] DEVICE FOR STABILIZING THE BRILLIANCY OF AN OSCILLOSCOPE

[75] Inventor: Fernand Secher, Lannion, France

[73] Assignee: Societe Lannionnaise d'Electronique Sle-Citerel

[22] Filed: June 11, 1973

[21] Appl. No.: 368,522

[30] Foreign Application Priority Data
June 9, 1972 France .............................. 72.20842

[52] U.S. Cl. .......... 315/383; 178/DIG. 29; 315/388
[51] Int. Cl. ............................................. H01j 29/70
[58] Field of Search .................. 315/30, 31 R, 27 R; 178/7.5 DC, 7.3 DC, DIG. 29

[56] References Cited
UNITED STATES PATENTS

| | | | |
|---|---|---|---|
| 2,965,712 | 12/1960 | Pike et al. ..................... | 178/DIG. 29 |
| 3,153,172 | 10/1964 | San Ling .............................. | 315/30 |
| 3,602,642 | 8/1971 | Van Den Avoort ......... | 178/DIG. 29 |
| 3,619,717 | 11/1971 | Lee .............................. | 178/DIG. 29 |

Primary Examiner—Maynard R. Wilbur
Assistant Examiner—J. M. Potenza
Attorney, Agent, or Firm—Craig & Antonelli

[57] ABSTRACT

A device for stabilizing the brightness of an oscilloscope including a differential circuit with two phototransistors, only one of which is positioned to receive illumination from the screen of the oscilloscope. In this way a contrast may be obtained which remains identical for a period of time having any desired duration.

6 Claims, 5 Drawing Figures

DEVICE FOR STABILIZING THE BRILLIANCY OF AN OSCILLOSCOPE

The present invention relates in general to systems for the regulation of magnitudes of selected parameters by a control system monitoring such parameters. More particularly, the present invention provides means for stabilizing the operating conditions of a monochromatic oscilloscope in such a manner as to provide a constant sensitivity. Thus, a constrast regulated to a constant value is obtained with a very high degree of precision for an indefinite period of time.

The present invention is employed particularly with special oscilloscopes or monitors used as transducers between an electrical signal derived from the analysis of an image by a television camera, and a photographic camera reconstituting the original image. Such a process is utilized currently in the transmission of images by artificial satellites. This process requires a very high degree of stabilization of the brightness of the intermediate oscilloscope, for example in the transmission of the image of a cloudy layer from a moving satellite, a transmission which may last for some 20 minutes. Moreover, in order that the photographs are usable, it is necessary that the light remain perfectly constant from one photograph to the next, and even from one day to the next.

The problem regarding the stabilization of the brightness of an oscilloscope, which demands an entire range of shades from black to white in addition to all the contrasts between the various shades of grey, is already very delicate in and by itself. Such a problem becomes practically insoluble by means of the known processes if these contrasts must be kept constant with time despite the variations of the sector supplying the oscilloscope, the aging of the tube, the thermal variations (time elapsed since placing the tube in operation), etc.

The known stabilization processes are based upon the regulation of the supply voltages, such as the high voltage and filament voltage. Independently of the difficulty and cost of a control system for the stabilization of a voltage of several kilovolts, such a regulation does not take into account all the parameters mentioned hereinabove, and thus, there remains very many requirements to be satisfied.

For this purpose, the present invention provides for a regulation loop by means of which the tube (terminal Z) receives, in addition to the video signal, a direct current voltage Vz which has been determined in a prior regulating process according to the conversion voltage derived from a phototransistor which is directed toward a particular point of the screen of the tube (point $x = 0$, $y = 0$, for example). A differential circuit with two phototransistors, only one of which is directed toward the screen, is connected to a differential amplification circuit, the electric conversion voltage of which assures the generation of a control voltage equal to a predetermined value of screen illumination, this control voltage being used for controlling the increase of a direct current voltage precisely to the value Vz desired to furnish the desired constant value of brightness.

It is immediately apparent that this method of stabilization integrates all the parameter deviations of the tube relating to picture brightness. As to deviations in the parameters of the photo-transistor, these are eliminated by the differential installation of two photo-transistors formed from the same manufacturing batch, one of which is not illuminated, followed by a differential amplification circuit.

Two embodiments according to the present invention will now be further described hereinafter, taken in connection with the accompanying drawings, wherein FIG. 1 is a schematic circuit diagram of the system as a whole, as proposed by the present invention, in which the voltage which increases with time is furnished by a device of the digital type;

Figure 1:
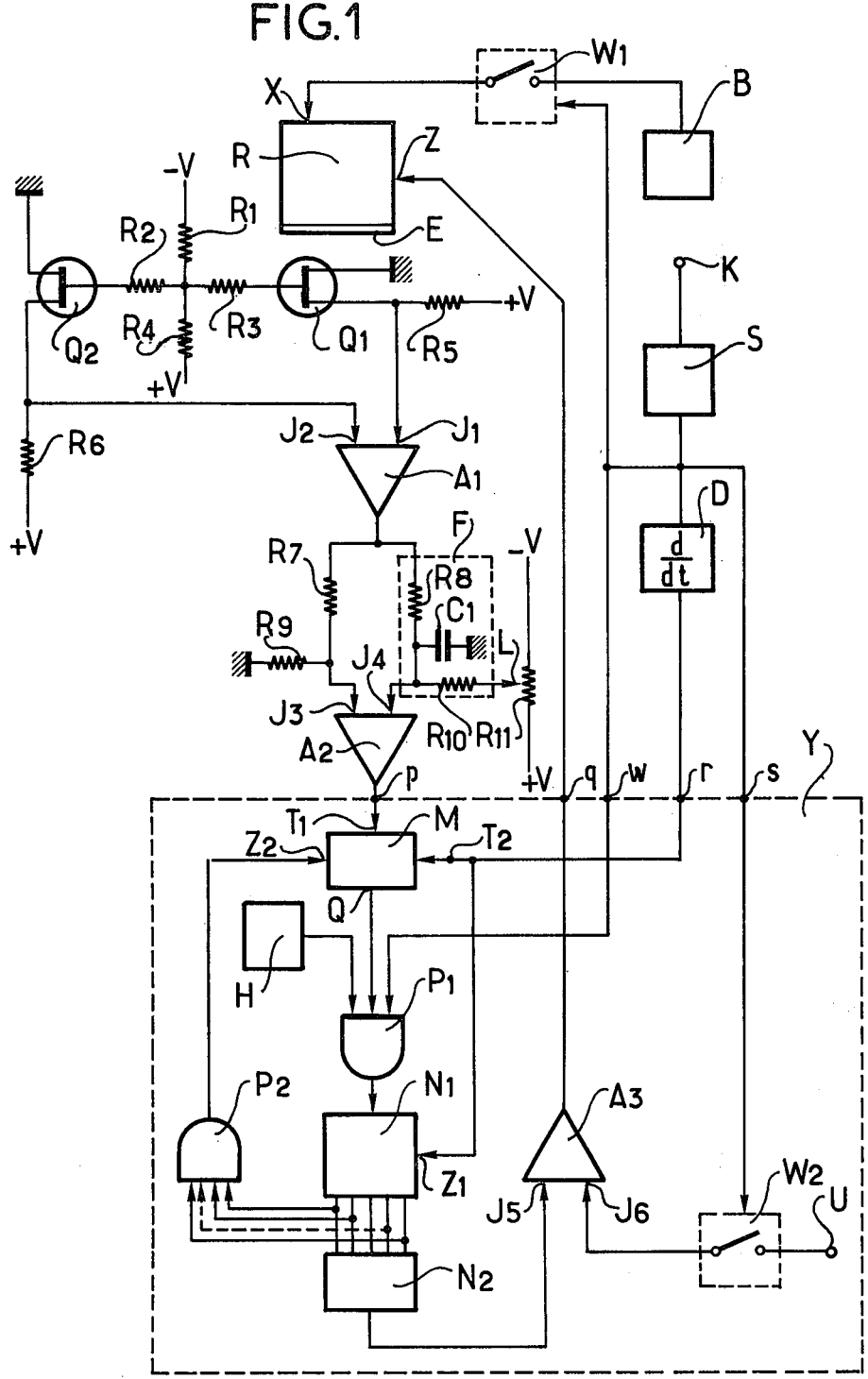

As seen in FIG. 1, an oscilloscope operating as a monitor R, having a photo-sensitive screen E, includes a scanning input X and a signal input terminal Z. Placed before a well-defined point of the screen E (see FIG. 2a) is a phototransistor Q1, preferably a field-effect photo-transistor, added to which is a second field-effect photo-transistor Q2, which itself is not affected by illumination from the screen E of the monitor. These photo-transistors Q1 and Q2 are supplied with supply voltages +V and −V through a group of resistors R1 through R6. The two photo-transistors Q1 and Q2 are not only of the same type, but of the same manufacturing batch, so as to effect in the best possible manner the compensation of the characteristics of transistor Q1 by those of transistor Q2 and of their possible deviations.

The output of transistor Q1 and the output of transistor Q2 are applied to the two inputs J1 and J2, respectively, of a differential amplifier A1. The output of the amplifier A1 is connected, on the one hand, to ground by a series connection of two resistors R7 and R9 having a common point J3 and, on the other hand, to a point L on a slide resistance or contact block resistance R11 by a series connection of two resistances R8 and R10 with a common point J4. The resistance R11 is connected between the supply terminals +V and −V. The point J4 is connected to ground by a capacitor C1. The network consisting of elements R8, R10, C1 forms a low-pass filter F. This will be further explained hereinbelow.

Points J3 and J4 are connected to two inputs of a comparator amplifier A2 whose output is connected to an input terminal T1 of a bistable flip-flop M. An AND gate P1 receives on the one hand the pulses furnished by a clock H, and on the other hand an authorization signal from the output Q of a flip-flop M, and finally a second authorization signal from a monostable multivibrator S.

The clock pulses issuing from the gate P1 act upon a counter N1 which is operatively connected with a numerical-analog converter N2, whose output signal is received by an input J5 of an adding amplifier A3. On another input J6, the amplifier A3 may receive a video signal, coming for example from a satellite, or a signal which has been previously recorded on a magnetic tape or the like.

A time base B assures the deflection of the spot of the monitor R as soon as an interrupter W1 is closed. If the interrupter W1 is open, the spot stops at the point of the screen $x = 0$, $y = 0$.

Due to the command of a starting order received on a terminal K (originating for example from a subassembly for treating the signal, not shown), a monostable multivibrator S transmits an opening signal to the gate P1, this opening signal having, for example, a duration of 100 milliseconds. A branch circuit D furnishes at the beginning of the opening signal a pulse front which resets the flip-flop M to 1 (input T2) and the counter N1 to zero (input Z1).

At the same time, the monostable multivibrator S transmits an opening order to the interrupter W1, which cuts off the access of the time base B on the input X of the monitor R, and to an interrupter W2, which cuts off the arrival of the video signal U on the input J6 of the amplifier A3.

The number representing "full capacity" of the counter N1 is decoded by an AND gate P2 which, for this condition, transmits to the flip-flop M an order for resetting the flip-flop to zero via the terminal Z2. The members M, H, P1, P2, N1, N2, A3, W2 are contained in a frame Y. The connections are made at the points $p, q, r, s, w$.

Figure 2A:
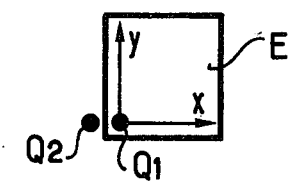
FIGS. 2a and 2b are schematic diagrams which indicate the physical disposition of certain members of the system.

FIG. 2a shows symbolically the physical disposition of the two photo-transistors Q1 and Q2 before the screen E of the monitor. Transistor Q1 is placed opposite the point $x = 0, y = 0$ of the screen, while transistor Q2 is outside of the area of the screen.

Figure 2B:
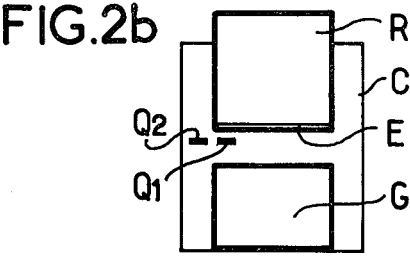

FIG. 2b is a view in a schematic view showing the provision of the monitor R, of the photo-transistors Q1 and Q2, and of a photographic camera G placed before the screen E of the monitor R. The entire unit is protected from the light by a cover C.

Figure 3:
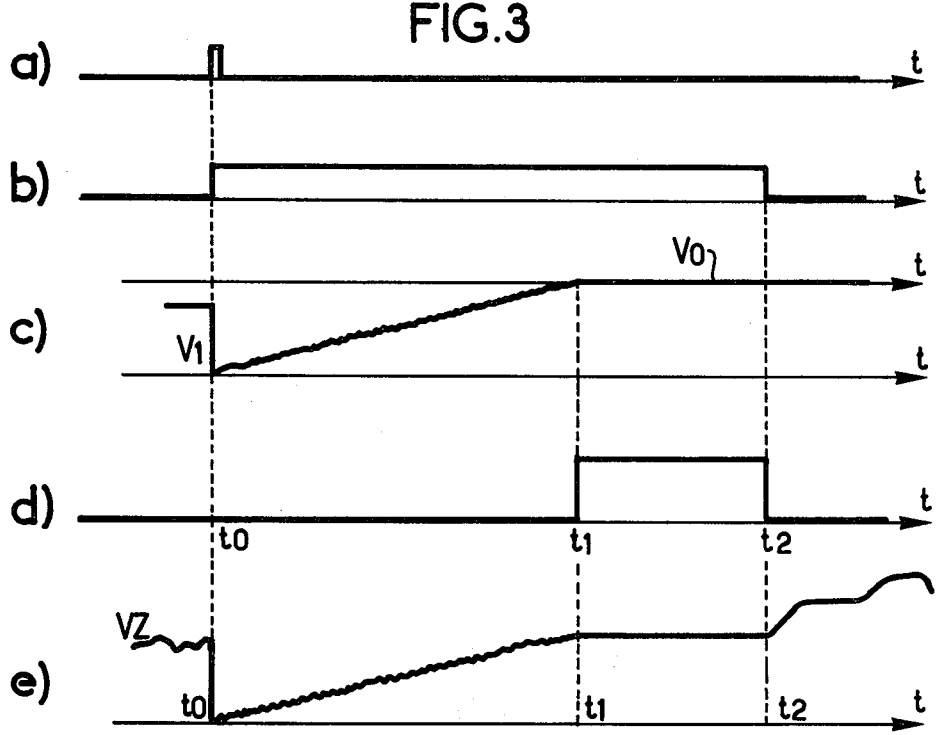
FIG. 3 is a waveform diagram explaining the operation of the system of FIG. 1.

FIG. 3 contains five waveforms:

Graph (a) indicates the presence of an order at K (FIG. 1) at the time $t0$.

Graph (b) shows an opening signal having a predetermined duration (for example 100 ms) $t0 - t2$, furnished by the monostable multivibrator S.

Graph (c) shows that the voltage V1 in J3 increases by degrees up to the time $t1$ where it becomes equal to the reference value Vo.

Graph (d) shows the appearance of a rising front on the terminal T1 at the time $t1$, followed by a platform from $t1$ to $t2$ (signal VT).

Graph (e) shows that the voltage Vz on the terminal Z contains first the video signal superimposed on a prior direct-current regulating voltage up to the time $t0$; from $t0$ to $t1$, the regulating voltage increasing in stages; from $t1$ to $t2$ a constant voltage; after $t2$ the sum of this constant voltage and of the video signal.

OPERATION

When a control order arrives at K, the monostable multivibrator S applies an opening signal to the gate P1. The bistable flip-flop M which has been set to 1 by the differentiating circuit D (terminal T2) lets the pulses of the clock H pass on to the counter N1, which has been reset to zero via terminal Z1. The converter N2 furnishes a voltage, which increases by stages, to the terminal Z of the monitor. As a result, the output voltage of the photo-transistor Q1, which receives an increasing luminous flux, increases in stages.

This increasing voltage V1 is received on the input J3 of the amplifier A2. On the other hand, the input J4 provided with a low-pass filter F lets pass only the constant value coming from the position of the point L on the resistance R11 (reference voltage). The input J3 of the amplifier A2 receives the output signal of the amplifier A1; likewise, the input J4 also receives the same signal, but via the low-pass filter F. The direct current component of the output signal of amplifier A1 is thus superimposed at J4 on the reference voltage. The reason for this is as follows. The compensation of the direct quiescent currents of the photo-transistors Q1 and Q2 by the differential amplifier A1 is not perfect. There exists a residual direct current component at the output of amplifier A1. This direct current component, which is applied to the two inputs J3 and J4 of the comparator amplifier A2, is eliminated at the output of the comparator.

Therefore, the comparator A2 produces a signal having a rising front at its output when the increasing component of the output voltage of A1 reaches the reference voltage Vo. This output signal, arriving on the terminal T1 of the flip-flop M, sets the output Q to zero. The pulses of the clock H no longer arrive on the counter N1, which keeps in memory the order of the stage of the corresponding voltage furnished by the converter N2 and applied by it to the input J5 of the amplifier A3.

The amplifier A3 applies to the terminal Z of the monitor a voltage VZ which assures the compatibility of the connections by determining on the screen E of the monitor at the reference point $x = 0, y = 0$ a brightness yielding a luminous flux which, received by transistor Q1, furnishes the voltage V1 which balances the reference voltage Vo.

The usefulness of the gate P2 is as follows. If, as a result of a disorder, or for whatever other reasons, a balance between voltage V1 and Vo has not been reached before the full capacity of the counter N1 (time $t2$) is reached, the stage of the voltage corresponding to full capacity is the regulation or adjustment which is the least undesirable. Otherwise, when exceeding the full capacity, the counter would return to zero and would produce a zero voltage at the output of the converter N2. It is therefore preferable to stop the arrival of pulses H when the full capacity is decoded by the gate P2, which sets the flip-flop M back to zero by way of the terminal Z2.

Figure 4:
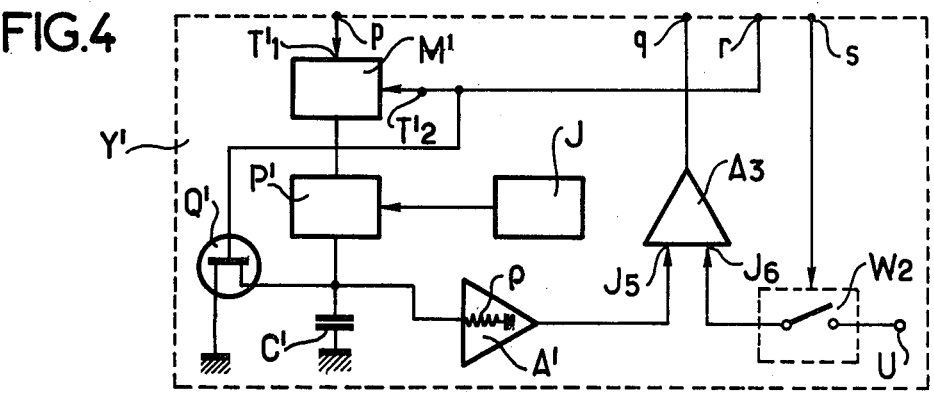
FIG. 4 is a schematic circuit diagram of a modified embodiment, in which the increasing control voltage is furnished by a device of the analog type.

In the system of the analog type, as seen in FIG. 4, only the members contained in the frame Y have been changed, and the latter is replaced therein by the frame Y'.

A bistable flip-flop M' is set to zero from point $p$ by a terminal T'1 and set to 1 from point $r$ by a terminal T'2. An analog gate P', in the open condition, lets pass a charging current of a capacitor C' from a current source J. The capacitor C' is then charged according to a time constant C'.p, wherein $p$ is the input impedance of an amplifier A'.

The output of the amplifier A' is connected to the input J5 of the amplifier A3 whose other input J6 may receive, as before, the video signal U transmitted by the interrupter W2, controlled from point $s$.

Point $r$ is also connected to the grid terminal of a field-effect transistor Q', which is connected to the terminals of a capacitor C'. The transistor Q' is rendered conductive for a short instant, for example in the order of 1 millisecond, at the beginning of a regulating or adjusting process, which has the effect of discharging the capacitor C'.

When the voltages on the terminals J3 and J4 of the amplifier A2 (FIG. 1) become equal, the bistable flip-flop M' is set to zero, and the voltage on the capacitor C' does not increase any more, but remains fixed.

What I claim is:

1. A device for the stabilization of the brightness of a display device, including a cathode ray tube having a brightness control input and a screen, a time base means for controlling the timing of operation of said cathode ray tube, comprising a first differential amplifier having two inputs, a first photo-transistor disposed before the screen of said cathode ray tube so as to receive illumination therefrom and being connected to one input of said first differential amplifier, a second photo-transistor disposed at a position isolated from the illumination of the screen of said cathode ray tube and being connected to a second input of said first differential amplifier, a second differential amplifier having two inputs, one input being connected to the output of said first differential amplifier and the other input being connected to a source of reference potential, control voltage generating means responsive to the output of said second differential amplifier for generating a control voltage which increases in a stepwise manner until the output of said first differential amplifier reaches the level of said reference potential as indicated by the output of said second differential amplifier, and an adder amplifier having one input connected to the output of said control voltage generating means and another input connected to a source of video signals, the output of said adder amplifier being connected to said brightness control input of said cathode ray tube.

2. A device as defined in claim 1, wherein said one input of said second differential amplifier is connected to the output of said first differential amplifier by way of a resistance network and the other input of said second differential amplifier is also connected to the output of said first differential amplifier through a low pass filter network.

3. A device according to claim 2, wherein said control voltage generating means comprises a bistable memory device connected to be reset to zero by the output of said second differential amplifier, a clock pulse generator, a pulse counter, a monostable multivibrator, and an associated numerical-analog converter whose output is connected to said one input of said adder amplifier, a first AND gate having one input connected to the output of said pulse generator, a second input connected to the output of said bistable memory device and a third input connected to the output of said monostable multivibrator, differentiating circuit means connected to the output of said monostable multivibrator for setting said bistable memory device and resetting said counter to zero.

4. A device according to claim 3, wherein said bistable memory device is reset to zero by the state of full capacity of said pulse counter by means of a second AND gate connected between the output of said pulse counter and said bistable memory device.

5. A device according to claim 2, wherein said control voltage generating means comprises a charge capacitor, a current source, a bistable memory device connected to be reset to zero by the output of said second differential amplifier, analog gate means connected to said current source and said capacitor for passing or interrupting the charging current to the capacitor according to the state of said bistable memory device, and means for discharging said capacitor at the begining of a regulating period.

6. A device according to claim 2, further including means for disconnecting said time base from said cathode ray tube and the video signal from said adder amplifier during the regulating period.

* * * * *